L. K. SNELL.
MOTOR VEHICLE.
APPLICATION FILED DEC. 2, 1915.
1,321,857.
Patented Nov. 18, 1919.
2 SHEETS—SHEET 1.
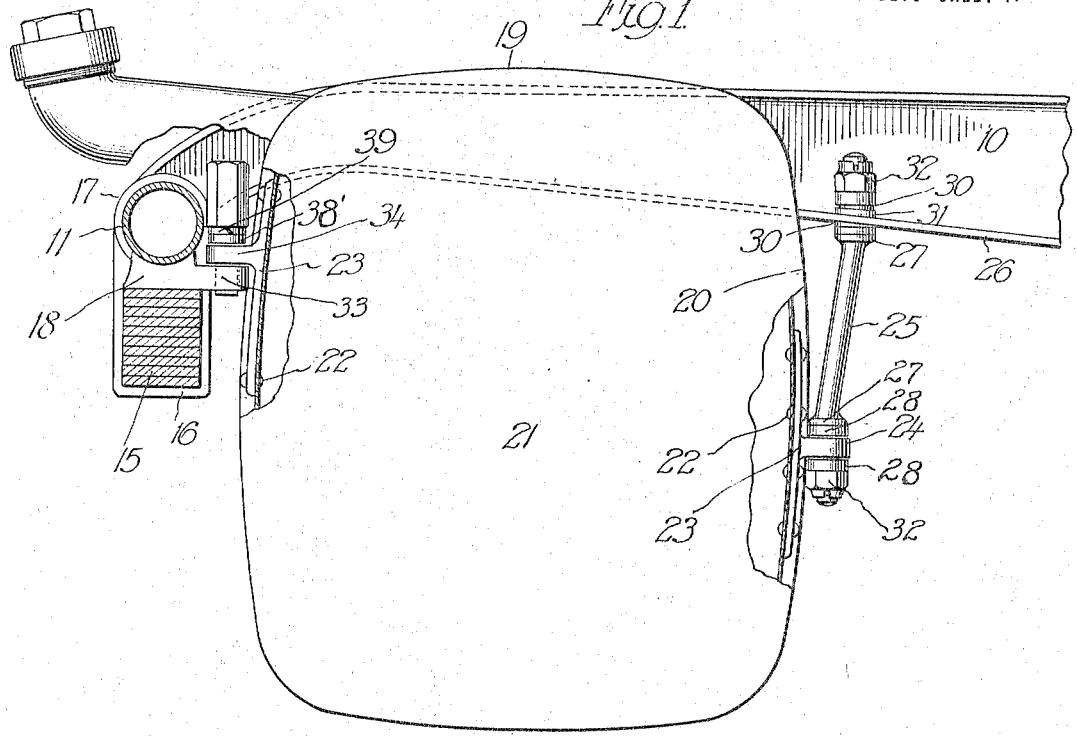
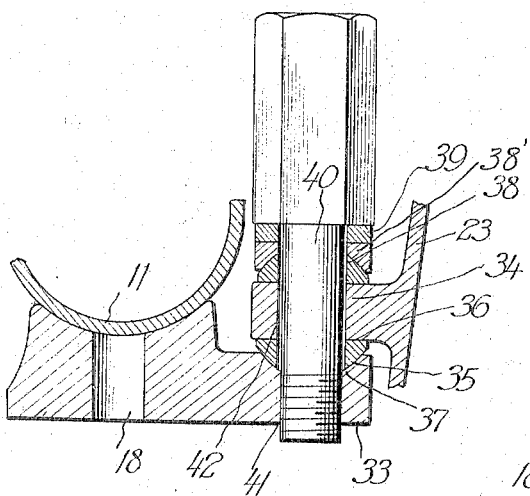
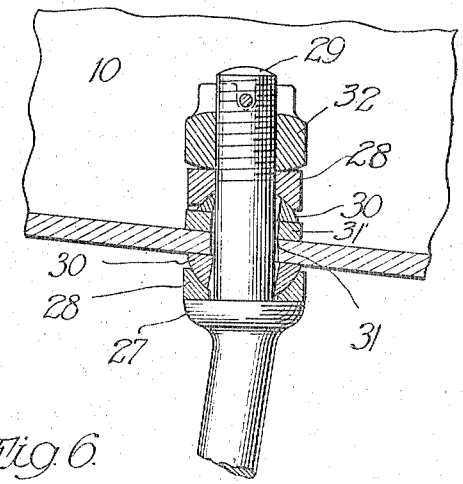
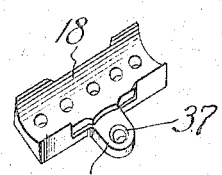
Inventor
Lyle K. Snell.

L. K. SNELL.
MOTOR VEHICLE.
APPLICATION FILED DEC. 2, 1915.

1,321,857.

Patented Nov. 18, 1919.
2 SHEETS—SHEET 2.

Witness
E. R. Barrett

Inventor
Lyle K. Snell
By Le Roi J. Williams
Attorney

UNITED STATES PATENT OFFICE.

LYLE K. SNELL, OF DETROIT, MICHIGAN, ASSIGNOR TO CADILLAC MOTOR CAR COMPANY, OF DETROIT, MICHIGAN, A CORPORATION OF MICHIGAN.

MOTOR-VEHICLE.

1,321,857.   Specification of Letters Patent.   Patented Nov. 18, 1919.

Application filed December 2, 1915. Serial No. 64,811.

*To all whom it may concern:*

Be it known that I, LYLE K. SNELL, a citizen of the United States, and resident of Detroit, Wayne county, State of Michigan, have invented certain new and useful Improvements in Motor-Vehicles, of which the following is a specification.

This invention relates to motor vehicles, and particularly to novel and improved tank suspension therefor.

One of the objects of this invention is to provide a durable and flexible suspension for tanks on a vehicle frame, particularly at the rear end thereof.

Another object of this invention is to provide a tank suspension, which will prevent the warping and weaving of the frame from being transmitted to the tank and its attaching means, thus obviating the difficulties heretofore encountered with previous constructions.

These, and other objects, will appear from the following description, taken in connection with the accompanying drawings, which form a part of this specification, and in which:

Figure 1 is a side elevation, with portions broken away, showing the rear end of a motor vehicle frame, embodying this invention;

Fig. 4 is a vertical sectional view, showing an assembly of the parts forming one of the points of attachment between the tank and a frame member;

Fig. 5 is a vertical sectional view illustrating an assembly of the parts forming another point of attachment between the tank and a frame member; and Fig. 6 is a perspective view of a spring perch, having a lug formed thereon, for supporting a part of the tank thereon.

Figure 2:
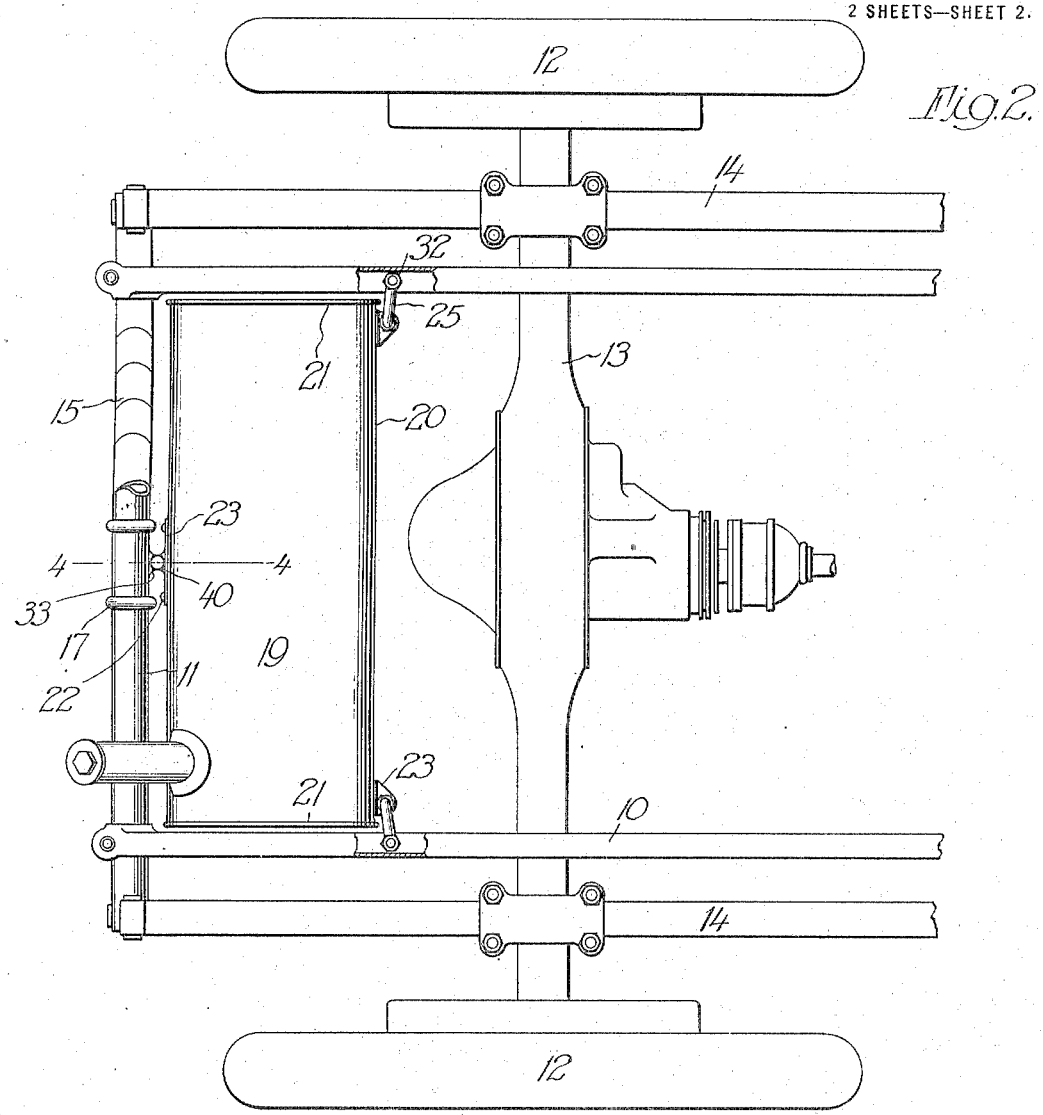
Fig. 2 is a plan view, with portions broken away, of a similar construction.
Figure 3:
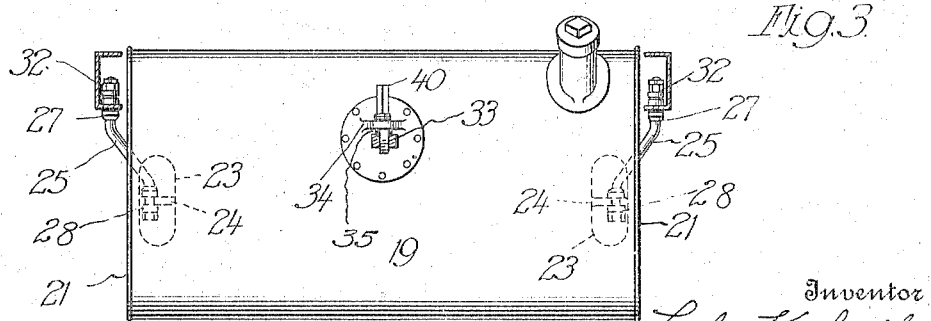
Fig. 3 is a rear elevation, with parts in section, showing my improved tank suspension.

Referring to the drawings, 10 represents the rear ends of vehicle frame side members, which may be connected, in any well known manner, by a cross member, illustrated, in the form of a tube 11. Driving wheels and an axle are illustrated at 12 and 13, respectively, and are adapted to support the frame through springs, comprising side sections 14, and a transverse section 15, which may be arranged between the bottom of the stirrups 16 of shackles 17, and a spring perch 18, these parts being suitably secured to the cross member 11.

A gasolene tank 19 may be arranged adjacent the rear end of the frame between the side members 10 and supported thereon by a three point flexible suspension, which will now be more particularly described.

Suitably secured as to the front side 20 of the tank, adjacent its opposite ends 21, as by welding or rivets 22, may be supporting plates 23, having a boss 24 formed therein. Hangers, in the form of rods 25 are adapted to provide, if desired, a flexible and detachable connection between one of the plates 23, and parts, such as flanges 26 of the frame side members 10. These connections may comprise springs, or ball and socket joints, which will now be more particularly described.

It will be noted that each of the upper ends of the illustrated hangers 25 has a shoulder 27 formed thereon, against which a socket member 28, which is arranged on the stem portion 29, is adapted to abut. A semispherical ball member 30 may then be also arranged on the stem portion adjacent the socket member 28, after which the hanger may be inserted in position in the opening 31 formed in the lower flange 26 of the side member 10. These parts may then be flexibly secured in position by arranging a washer or spacer 31', then another ball member 30, a socket member 28, and a securing nut 32. The lower joint between the hangers or arms 25 and the tank comprise the same parts in similar relation, with the exception that the spacing washer 31' is not used as a result of the increased thickness of the boss 24; and it will be understood in this connection that the boss 24 of the plate 23 performs the same function in the lower joint as the flange 26 of the frame side member 10. It will also be noted that considerable clearance is provided between the outer diameter of the stem 29 of the hangers or arms 25 and the inner diameters of certain of the parts arranged thereon, thus permitting the frame side members to move relatively to the tank and vice versa, without straining or distorting the suspended parts or their means of attachment to the frame members.

The rear end of the tank is provided with a similar plate 23, which is arranged intermediate the ends 21, and may be secured in position, as by rivets 22. This plate may be connected to the cross member 11 through suitable means, such as a flexible ball and socket joint, in form similar to that which has been previously described, the latter joint being arranged between a boss 33, formed on the spring perch 18, and the boss 34 formed on the rear side plate 23. To assemble these parts in position, the semispherical ball member 35 is arranged between the lower surface 36 of the boss 34 and the socket 37, formed in the boss 33. The boss 34 may then be arranged in position, and then in turn, a ball member 38, socket member 38', washer 39 and bolt 40 may be arranged in order and adjusted in position by threading the bolt 40 in the boss 33, as at 41.

It will, of course, be understood that a clearance 42 is provided between the bolt 40 and certain of the parts arranged thereon, to permit a relative rocking movement between the associated parts. While I have shown flexible joints at all three joints, it is of course, obvious that all need not be so constructed.

While I have described a preferred embodiment of my invention, it will be understood that various changes and modifications may be made, by one skilled in the art, without departing from the spirit and scope of my invention.

Having described my invention, what I claim and desire to secure by Letters Patent is:—

1. In a motor vehicle, and in combination with the frame thereof having two side members and a cross member; a reservoir; two rigid supporting rods or hangers depending one from each of said side members; joints at the upper ends of said hangers adapted to permit motion of said hangers in all directions relative to the pivotal point of support between their upper ends and said side members, and to prevent vertical movement of said upper ends relative to said side members; means for connecting the lower ends of said hangers with said reservoir at points adjacent the ends thereof, and through joints which will permit universal movement of said hangers about the pivotal connections thus provided, but which will prevent vertical movement of the tank relative to said hangers; and means for supporting the central portion of said reservoir from said cross bar.

2. In a motor vehicle and in combination with the frame thereof having two side members and a cross member; a reservoir; two rigid supporting rods or hangers depending one from each of said side members; joints at the upper ends of said hangers adapted to permit motion of said hangers in all directions relative to the pivotal point of support between their upper ends and said side members, and to prevent vertical movement of said upper ends relative to said side members; means for connecting the lower ends of said hangers with said reservoir at points adjacent the ends thereof, and through joints which will permit universal movement of said hangers about the pivotal connections thus provided, but which will prevent vertical movement of the tank relative to said hangers; and supporting means associated with said reservoir and located adjacent the central portion thereof, and through which said reservoir is supported from said cross bar and held permanently in fixed relation relative thereto.

3. In a motor vehicle and in combination with the frame thereof having two side members, and a cross member; a reservoir; means for supporting the central portion of said reservoir from said cross bar in such a manner as to permit movement about a fixed point; two rigid supporting rods or hangers depending one from each of said side members and the upper ends of which are held against vertical movement relative to said members, and which holding means is of such a character as to provide for angular movement of said hangers about their points of connection with said side members; and means for connecting the lower ends of said hangers with said reservoir adjacent the ends thereof, and the construction of which last mentioned means is such as to permit universal movement of said hangers about their points of connection with said reservoir.

4. In a motor vehicle and in combination with the frame thereof having two side members, and a cross member; a reservoir; two rigid supporting rods or hangers depending one from each of said side members; ball joints between the upper ends of said hangers and said side members adapted to permit angular movement of said hangers, but to prevent vertical movement thereof relative to said side members; ball joints provided between the lower ends of said hangers and said reservoir adjacent the ends thereof, and the construction of which joints is such as to permit swinging movement of said hangers but to prevent vertical movement of said reservoir; and means for supporting the central portion of said reservoir from said cross member.

5. In a motor vehicle and in combination with the frame thereof having two side members, and a cross member; a reservoir; two rigid supporting rods or hangers depending one from each of said side members; ball joints between the upper ends of said hangers and said side members adapted to permit angular movement of said hangers, but to prevent vertical movement thereof relative to said side members; ball joints provided between the lower ends of said hangers and said reservoir adjacent the ends thereof, and the construction of which joints is such as to permit swinging movement of said hangers but to prevent vertical movement of said reservoir; supporting means carried by said cross member, and means for providing a ball and socket connection between the central portion of said reservoir and said supporting means to thereby support said central portion from said support, and in a manner such as to permit movement about a fixed point.

6. In a motor vehicle and in combination with a frame thereof having two side members and a cross member; a reservoir; two rigid supporting rods or hangers depending one from each of said side members; means for providing pivotal connections or joints between the lower ends of said hangers and one side of said tank adjacent the ends thereof, and which means are of such a character as to prevent vertical movement of said reservoir; means for providing pivotal connections between the upper ends of said hangers and said side members, and which means are of such a character as to prevent vertical movement of said hangers relative to said side members; and means for supporting the opposite side of said reservoir from said cross member adjacent the central portion thereof.

7. In a motor vehicle and in combination with a frame thereof having two side members and a cross member; a reservoir; two rigid supporting rods or hangers depending one from each of said side members; means for providing pivotal connections or joints between the lower ends of said hangers and one side of said tank adjacent the ends thereof, and which means are of such a character as to prevent vertical movement of said reservoir; means for providing pivotal connections between the upper ends of said hangers and said side members, and which means are of such a character as to prevent vertical movement of said hangers relative to said side members; and means for providing a pivotal connection between the central portion of said reservoir and said cross member, said means being of such a character as to prevent vertical movement of the reservoir.

8. In a motor vehicle and in combination with a frame thereof having two side members, and a cross member; a reservoir; two rigid supporting rods or hangers depending one from each of said members; means for connecting the upper ends of said hangers with said side members, and the lower ends thereof with said reservoir adjacent the ends thereof; each of said connecting means comprising two socket members spaced apart from one another and having each a spherical seat, two semi-spherical ball members adapted to engage said seats, and having each a central hole through which a stem of the hanger extends, and a nut in engagement with said stem; and means for supporting the central portion of said reservoir from said cross member.

9. In a motor vehicle and in combination with a frame thereof having two side members, and a cross member; a reservoir; two rigid supporting rods or hangers depending one from each of said members; means for connecting the upper ends of said hangers with said side members, and the lower ends of which are connected with one side of said reservoir adjacent the ends thereof; each of said connecting means comprising two socket members spaced apart from one another and having each a spherical seat; two semi-spherical ball members adapted to engage said seats, and having each a central hole through which a stem of the hanger extends, and a nut in engagement with said stem; and means located adjacent the central portion of said reservoir for supporting the other side thereof from said cross member.

In testimony whereof I affix my signature in the presence of two witnesses.

LYLE K. SNELL.

Witnesses:
RICHARD HARFST,
F. L. DAVIS.